Jan. 24, 1928.　　　　　W. SCHWEMLEIN　　　　　1,656,992
REENFORCING SLEEVE FOR TUBULAR SHAFTS
Filed April 14, 1926
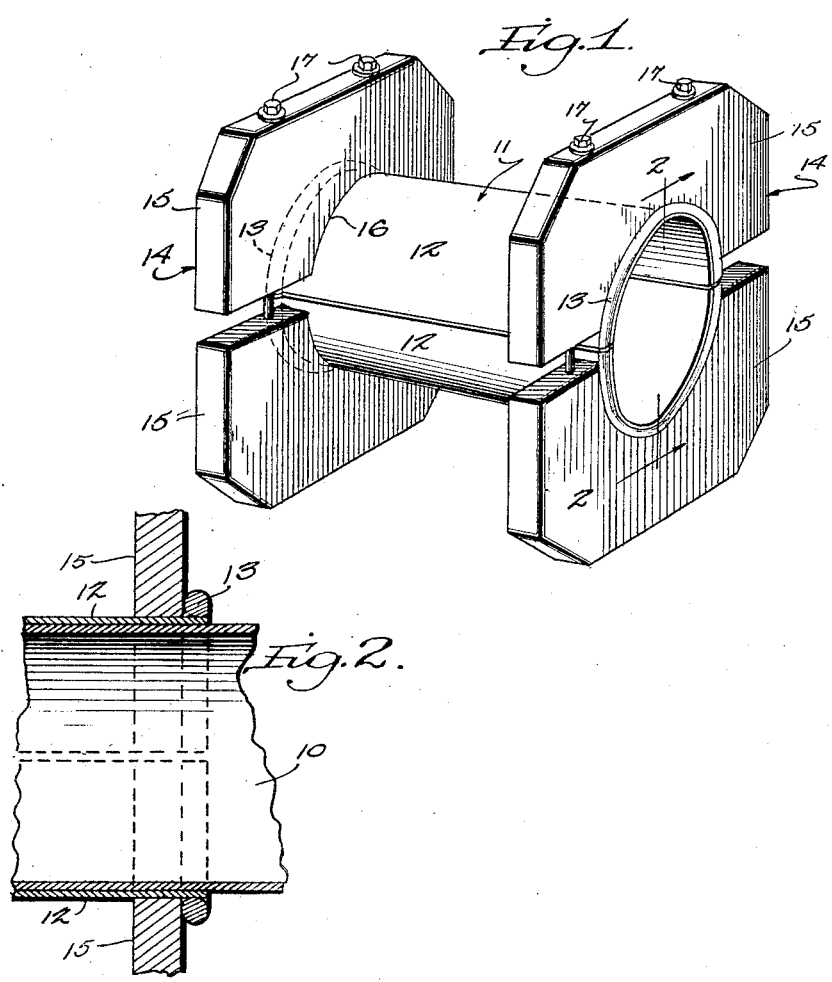
Inventor
W. SCHWEMLEIN Patented Jan. 24, 1928.

1,656,992

UNITED STATES PATENT OFFICE.

WILLIAM SCHWEMLEIN, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

REENFORCING SLEEVE FOR TUBULAR SHAFTS.

Application filed April 14, 1926. Serial No. 101,952.

This invention relates to reenforcing sleeves for tubular shafts, and more particularly for the shafts of bull wheels and the like used in connection with oil well drilling apparatus.

It has been found that the tubular shafts usually provided for bull wheels and the like are sufficiently strong for the ordinary work to be performed. Occasionally, however, the tubular shafts are subjected to considerable additional strains which make it desirable to provide a heavier shaft. The demands for a heavier shaft, however, occur so seldom that the additional cost of a heavier shaft is not justified.

An important object of the present invention is to provide a sleeve attachment for tubular shafts which readily may be applied to and removed from the shaft whereby additional strength may be provided for the shaft when needed.

A further object is to provide a split sleeve formed of a pair of complementary semi-cylindrical members adapted to be clamped about a tubular shaft to provide additional strength therefor when desired.

A further object is to provide a device of the character just mentioned provided with novel attaching means adapted to maintain it in position on the tubular shaft.

Other objects and advantages of the invention will become apparent during the course of the following description.

In the drawings I have shown one embodiment of the invention. In this showing:

Figure 1 is a perspective view of one form of reenforcing sleeve,

Figure 2 is a fragmentary central sectional view through one end of the sleeve.

Referring to Figures 1 and 2 the numeral 10 designates a tubular shaft of the type employed in connection with bull wheels, calf wheels, sand reel drums, rotary draw works drums, and the like. Such devices are employed in connection with oil well drilling apparatus, and as previously stated, are sufficiently heavy to perform the work which they are usually called upon to do. Occasionally, however, it is necessary or desirable to reenforce the tubular shafts when the strains thereon are unusually heavy. Accordingly I provide a reenforcing sleeve designated as a whole by the numeral 11. This sleeve comprises a pair of complementary substantially cylindrical members 12 adapted to surround the tubular shaft, as shown in Figure 2. Each member 12 may be provided at its ends with semi-circular stiffening ribs 13 which may be welded or otherwise secured to the section, as will be apparent. The complementary sections of the sleeve may be secured about the tubular shaft by spool clamps 14. As shown, each clamp comprises complementary sections 15 and the sections are provided with arcuate cut out portions 16 snugly fitting the sleeve sections, as clearly shown in Figure 1. The spool sections are adapted to be secured together by bolts 17 which extend through openings in the spool sections outwardly of the sleeve 11. In the form of the invention just described, the spool clamps serve as confining means for the cables usually wound upon the tubular shaft, but when the present device is employed it will be obvious that the cables will be wound upon the reenforcing sleeve 11.

The operation of the device will be apparent from the foregoing description. In the form of the device shown in Figures 1 and 2 the sleeve sections 11 are placed in the desired position upon the tubular shaft and are held in position while the spool clamping sections 15 are applied, as shown. The spools are arranged snugly against the sleeve sections 12 and contact with the reenforcing ribs 13. The bolts 17 are then applied and tightened and the device is ready for use, the bull wheel or the like being operated in the usual manner.

The use of the device described serves to effectually reenforce the tubular shaft to permit it to be subjected to abnormal strains when the occasion requires. Thus the bull wheels and the like may be manufactured with the usual tubular shafts. The device as described can be readily applied to the tubular shaft and removed therefrom whenever necessary or desirable.

It is to be understood that the forms of the invention herewith shown and described are to be taken as preferred examples of the same and that various changes in the shape, size and arrangement of parts may be resorted to without departing from the spirit of the invention or the scope of the subjoined claim.

I claim:

A device of the character described comprising a substantially cylindrical reenforcing sleeve formed of a pair of complementary members adapted to snugly surround a tubular shaft, a rib carried by each of said members adjacent each end thereof, a clamp engaging each end of each of said members and contacting with the ribs thereon, said clamps projecting laterally beyond said sleeve, and bolts passing through the projecting portions of said clamps.

In testimony whereof I affix my signature.

WILLIAM SCHWEMLEIN.